March 24, 1942.  F. M. CUNNINGHAM  2,277,212
JOINT FOR ELECTRICAL CONDUCTORS
Filed June 5, 1940  2 Sheets-Sheet 1
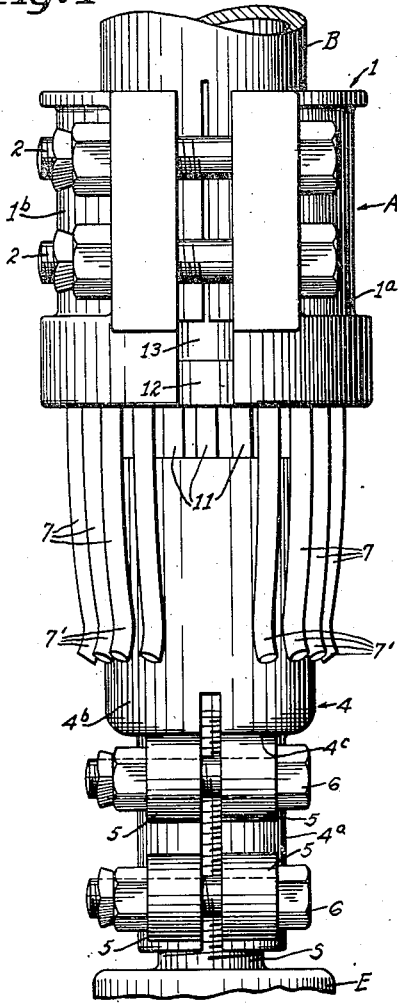
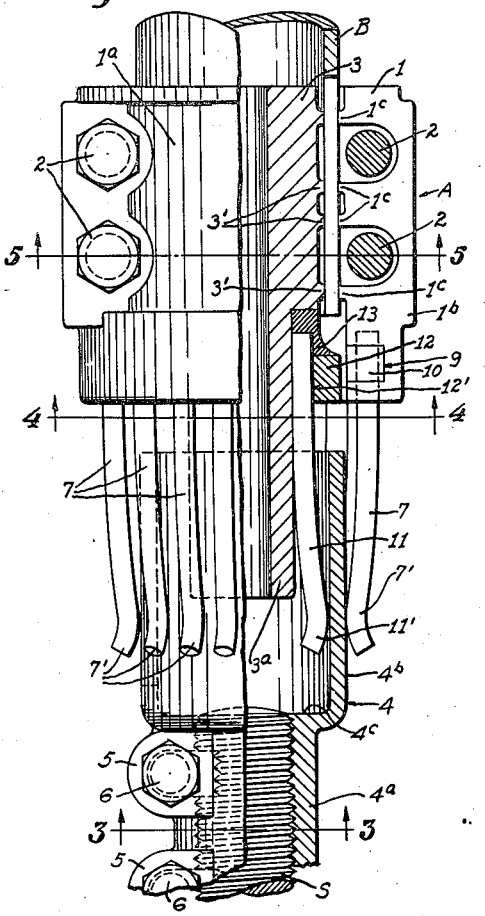
INVENTOR
FIRMIN M. CUNNINGHAM
BY E. M. Harrington
ATTORNEY March 24, 1942.  F. M. CUNNINGHAM  2,277,212
JOINT FOR ELECTRICAL CONDUCTORS
Filed June 5, 1940  2 Sheets-Sheet 2
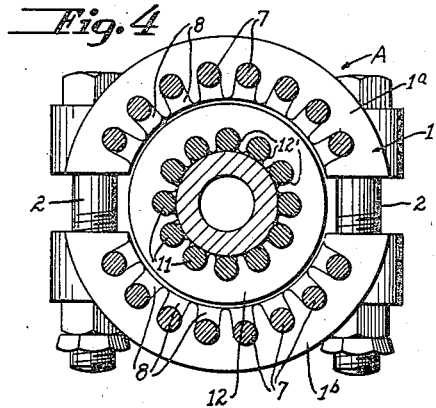
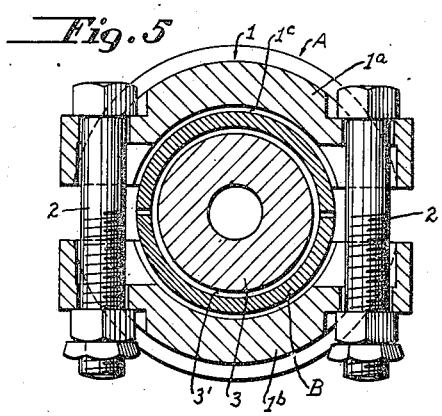
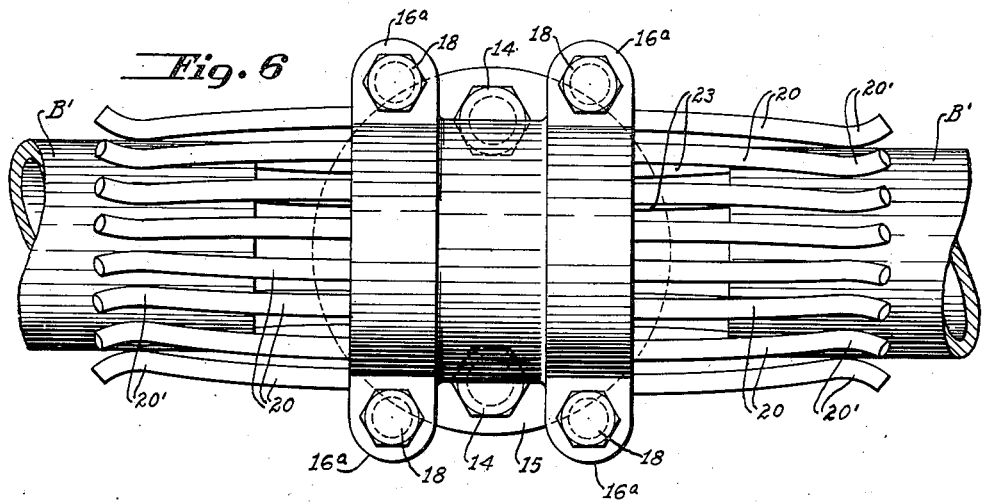
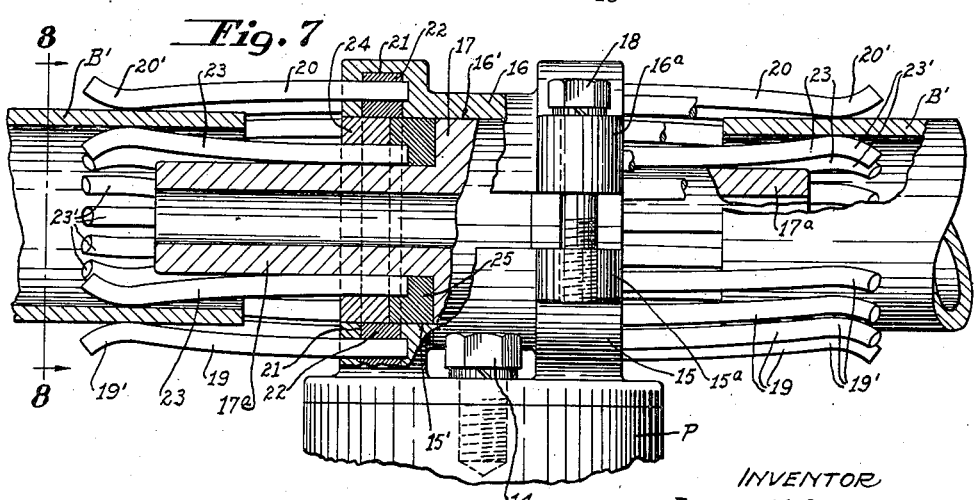
INVENTOR
FIRMIN M. CUNNINGHAM
BY E. M. Harrington
ATTORNEY Patented Mar. 24, 1942

2,277,212

UNITED STATES PATENT OFFICE 2,277,212

JOINT FOR ELECTRICAL CONDUCTORS

Firmin M. Cunningham, Maplewood, Mo., assignor to James R. Kearney Corporation, St. Louis, Mo., a corporation of Missouri Application June 5, 1940, Serial No. 338,879

6 Claims. (Cl. 173—324)

This invention relates generally to joints for electrical conductors and more specifically to a joint structure adapted to provide such mechanical and electrical connection for a onductor member that said conductor member may be capable of movement with respect to an article to which it is joined without affecting either the mechanical or the electrical connection therebetween, the predominant object of the invention being to provide a joint of the type mentioned which is capable of performing its intended function in a highly efficient manner.

While joints of the improved construction disclosed herein are adapted for a number of uses, one important application thereof is in association with bus bars of power stations. As is quite generally known by persons familiar with such matters, bus bars of power stations are frequently quite long and are made up of numbers of sections which are connected together to provide continuous bus bars, such bus bars usually being supported by porcelain insulators. Due to the fact that bus bars are subjected to expansion and contraction in response to temperature changes, and because said bus bars receive short circuit stresses and shocks which would be likely to do damage to the supporting porcelain insulators if the bus bars were rigid and unyielding, it is necessary to provide joints between adjacent sections of the bus bars, and between sections of bus bars and articles of electrical equipment, which permit independent movement of the bus bar sections. However, prior to this invention, yielding joints for connecting bus bar sections performed purely mechanical functions, and independent flexible electrical conductors were employed to provide electrical connection between the adjacent bus bar sections connected mechanically by the yieldable joints heretofore employed, and between bus bar sections and articles of electrical equipment.

The outstanding feature of the joint disclosed herein is that it serves the function of providing for such mechanical connection between adjacent bus bar sections, and between bus bar sections and articles of electrical equipment, that permits independent movement of the bus bar sections connected by the joint, and additionally, the improved joint is so constructed and arranged that it provides electrical connection between an adjacent pair of bus bar sections joined by the joint, or between a bus bar section and an article of electrical equipment so connected. Thus the independent flexible conductors heretofore employed to electrically connect adjacent pairs of bus bar sections joined by yieldable joints, or bus bar sections and articles of electrical equipment so joined, are eliminated and the joints themselves serve the dual function of mechanically and electrically connecting the bus bar sections to other bus bar sections or to articles of electrical equipment.

Fig. 1 is a plan view of the improved joint, portions of a bus bar section and a piece of equipment being broken away.

Fig. 2 is a view partly in side elevation and partly in longitudinal section of the structure illustrated in Fig. 1.

Fig. 3 is a cross-section taken on line 3—3 of Fig. 2.

Fig. 4 is a cross-section taken on line 4—4 of Fig. 2.

Fig. 5 is a cross-section taken on line 5—5 of Fig. 2.

Fig. 6 is a plan view of a modified form of the invention.

Fig. 7 is a view partly in side elevation and partly in longitudinal section of the structure illustrated in Fig. 6.

Fig. 8 is a cross-section taken on line 8—8 of Fig. 7.

In the drawings, wherein are shown for the purpose of illustration, merely, two embodiments of the invention, A designates in Figs. 1 to 5, inclusive, the improved joint generally. In certain of the views mentioned B designates a section of a bus bar which is of tubular formation, and S designates a screwthreaded terminal stud which is extended from an article E of electrical equipment, a transformer or an oil switch, for instance, (Fig. 1). The section of bus bar B and the terminal stud S are spaced apart, as shown in Figs. 1 and 2, and the joint A bridges the space therebetween.

Embracing the end portion of the section of bus bar B is a clamp 1 which comprises a pair of arcuate clamping members 1ª and 1ᵇ, said clamping members having associated therewith opposed pairs of bolt and nut assemblies 2 which serve in an obvious manner, and as illustrated, to draw the clamping members 1ª and 1ᵇ into rigid, clamping relation with respect to the outer surface of the bus bar section B. Preferably the clamping members 1ª and 1ᵇ are provided with arcuate ribs 1ᶜ which contact with the outer surface of the bus bar section B when said clamping members are drawn into clamping relation with said bus bar section.

Disposed within the end portion of the bus bar section B is a tubular member 3 which is provided on its outer face with annular ribs 3' that contact closely with the inner face of said bus bar section B. The tubular member 3 includes a portion 3ª which is an extension of the portion of said tubular portion disposed within the end portion of the bus bar section B, and said extension 3ª is projected outwardly a substantial distance beyond the end of said bus bar section. As shown to the best advantage in Fig. 2 the wall of the extension 3ª of the tubular member 3 is of substantially less thickness than the wall of the portion of said tubular member which is disposed within the end portion of the bus bar section B. Obviously the action of drawing the clamping members 1ª and 1ᵇ into tight clamping relation with the outer surface of the bus bar section B by means of the bolt and nut assemblies 2 will cause the inner end portion of the tubular member 3 to be securely clamped within said bus bar section.

The terminal stud S supports an element 4 which includes a split, stud-receiving end portion 4ª, and a hollow, tubular portion 4ᵇ that is of greater diameter than said stud-receiving portion and extends therefrom toward the adjacent end of the bus bar section B. The end of the hollow tubular portion 4ᵇ of the element 4 is open, as shown in Fig. 2 and a wall 4ᶜ is provided at the opposite end of said hollow, tubular portion 4ᵇ where it joins the stud-receiving portion 4ª of said element 4. The stud-receiving portion 4ª of the element 4 has formed therethrough a screw-threaded opening that receives the terminal stud S, and said stud-receiving portion 4ª is provided with ears 5 having openings through which clamping bolts 6 are extended to clamp the split stud-receiving portion on the terminal stud S and prevent unintended movement of the element 4 relative to the stud S.

Supported by each of the clamping members 1ª and 1ᵇ is a plurality of contact elements 7 which are arranged in an arcuate row that follows the shape of the clamping member by which they are supported as shown in Figs. 3 and 4. The contact elements 7 are in the form of resilient rods having curved, outer end portions 7' which contact with the outer face of the hollow, tubular portion 4ᵇ of the element 4, and the opposite, or inner, end portions of said contact elements are anchored to one or the other of the clamping members 1ª and 1ᵇ. In order to anchor the contact elements to the clamping members 1ª and 1ᵇ each of said clamping members is provided with a group of radially disposed openings 8 which extend from the inner faces of the clamping members inwardly thereof to points located approximately midway between the inner and outer faces of said clamping members (Fig. 4). The contact elements 7 are seated in the inward portions of the openings 8 and an arcuate groove 9 (Fig. 2) is formed in each of the clamping members 1ª and 1ᵇ so that it intersects the openings 8 of the clamping member. Because of this arrangement portions of the contacts 7 are extended across the arcuate groove 9, and the contact elements are secured to the clamping members by forming a weld 10 in the groove 9, which fills said groove and secures the contact elements firmly to the clamping members.

The improved joint includes a second group of contacts 11 in the form of resilient rods which are similar to the contacts 7 and are supported by the tubular member 3. The contacts 11 are arranged in circular formation and are provided with curved outer end portions 11' which contact with the inner face of the wall of the tubular portion 4ᵇ of the element 4 (Fig. 2). The inner end portions of the contacts 11 are anchored to the tubular member 3 by an arrangement that includes the use of a ring 12 which embraces the portion 3ª of the tubular member 3, as shown in Figs. 2 and 4. The ring 12 is provided at its inner face with a plurality of notches 12' which receive the inner end portions of the contacts 11, and an annular weld 13 is formed, as shown in Fig. 2, which secures the ring 12, contacts 11, and the tubular member 3 together.

In the use of a joint constructed and arranged as illustrated in Figs. 1 to 5, inclusive, the contacts 7 and 11, contacting with the outer and inner faces of the wall of the portion 4ᵇ of the element 4, provide mechanical connection between bus bar section B and the terminal stud S that permits of substantially universal movement of said bus bar section relative to the terminal stud S. Also, because the contacts 7 and 11 exert firm point pressure contact with the opposed faces of the wall of portion 4ᵇ of the element 4, perfect electrical connection is made between the terminal stud S and the bus bar section B which is not disturbed in any manner by independent movement of said bus bar section B.

In Figs. 6, 7, and 8, a modified form of the invention is illustrated according to which the improved joint is supported by an insulator P so that it mechanically and electrically connects a pair of adjacent bus bar sections B'. The insulator P has fixedly mounted thereon by means of bolts 14 a clamping member 15, said clamping member 15 being provided with an arcuate clamping face 15'. Arranged in opposed relation with respect to the clamping member 15 is a second clamping member 16 which is provided with an arcuate clamping face 16', and arranged between the clamping members 15 and 16 is a tubular member 17. The arcuate clamping faces of the clamping members 15 and 16 contact with the circumferential face of the central portion of the tubular member 17 which is of greater diameter than the end portions 17ª that extend in opposite directions from said central portion. The clamping members 15 and 16 are provided with outwardly extended ears 15ª and 16ª with which are associated clamping bolts 18 that serve to draw the clamping member 16 downwardly so as to clamp the tubular member 17 tightly between the arcuate clamping faces of said clamping members.

Extending in opposite directions from the clamping member 15 are groups of contacts 19, said contacts being anchored to said clamping member 15 at their inner end portions and being provided with curved outer end portions 19' which contact with the outer faces of the bus bar sections B'. Also, extended in opposite directions from the clamping member 16 are similar groups of contacts 20 which are anchored to said clamping member 16 at the inner end portions and are provided at their outer end portions with curved portions 20' which contact with the outer surface of the bus bar sections B'. The contacts 19 and 20 are secured to the clamping members 15 and 16 in a manner somewhat similar to the manner, already described herein, for attaching the contacts 7 to the clamping members 1ª and 1ᵇ of the structure illustrated in Figs. 1 to 5, inclusive. In other words the contacts 19 and 20 are supported in openings formed in the clamping members 15 and 16 so that portions of the contacts extend across arcuate grooves 21, and these arcuate grooves receive welds 22 which secure the contacts in place.

The joint structure illustrated in Figs. 6, 7 and 8, includes also groups of contacts 23 which are supported by the tubular member 17 and extend in opposite directions longitudinally thereof. Each group of contacts 23 is arranged in circular formation and in embracing relation with respect to the outer portions of the tubular member 17, and curved portions 23' are provided at the outer ends of said contacts 23 which contact with the inner faces of the bus bar sections B'.

The inner end portions of the contacts 23 are secured to the tubular member 17 with the aid of companion rings 24 and welds 25 (Fig. 7) which rings are suitably notched to receive the contacts. Because of the welds 25 the rings 24, contacts 23, and the tubular member 17 are secured together to provide a unitary structure.

Obviously, when the structure illustrated in Figs. 6, 7, and 8, is in use, the resilient contacts 19, 20, and 23 serve to provide mechanical support for the bus bar sections B' which permits substantial universal movement of said bus bar sections relative to the insulator P. Also, because of the point pressure contact exerted against the outer and inner faces of the walls of the bus bar sections B', perfect electrical connection is provided through the joint between said bus bar sections B'.

In the use of both forms of the invention illustrated and described herein the contacts 7 and 11, of Figs. 1 to 5, inclusive, and the contacts 19, 20, and 23, of Figs. 6 to 8, inclusive, serve as alinement guides which maintain the alinement of the associated bus bar section or sections. Also, because of the resilient nature of said contacts they always engage the associated bus bar sections tightly so that there is no opportunity for a chattering action to be developed. Finally the improved joint permits of independent movement of the bus bar section, or sections, associated therewith without interfering in any manner with the perfect electrical connection provided through the joint for the bus bar section, or sections, connected mechanically and electrically thereby.

I claim:

1. A joint adapted for use in association with a pair of spaced tubular electrical conductors, comprising a clamp which is mounted on one of said spaced tubular electrical conductors, a tubular member having a portion which is located within the tubular electrical conductor on which said clamp is mounted, said clamp being disposed in embracing relation with respect to the part of the tubular electrical conductor in which said portion of said tubular member is located, a plurality of elongated resilient contact elements supported by said clamp and extended beyond an end thereof and arranged in contact with the outer face of the other of said spaced tubular electrical conductors, and a plurality of elongated resilient contact elements supported by said tubular member and extended from an end thereof and arranged in contact with the inner face of said other of said spaced tubular electrical conductors.

2. A joint adapted for use in association with a pair of spaced tubular electrical conductors comprising a clamp which is mounted on one of said spaced tubular electrical conductors, a tubular member having a portion which is located within the tubular electrical conductor on which said clamp is mounted, said clamp being disposed in embracing relation with respect to the part of the tubular electrical conductor in which said portion of said tubular member is located, a plurality of elongated resilient contact elements supported by said clamp and extended beyond an end thereof and arranged in contact with the outer face of the other of said spaced tubular electrical conductors, and a plurality of elongated resilient contact elements supported by said tubular member and extended from an end thereof and arranged in contact with the inner face of said other of said spaced tubular electrical conductors, said elongated resilient contact elements being provided with curved contacting portions at points where they contact with the outer and inner faces of said other tubular electrical conductor.

3. A joint for mechanically engaging and electrically connecting an electrical conductor, comprising in combination a tubular electrical conductor, a support, a contractile clamp mounted on said support, a member having a portion engaged within said clamp for securement to said support by contractile clamping action of said clamp, a plurality of elongated resilient contact elements supported by said clamp and extended beyond an end thereof and arranged in contact with the outer face of said tubular electrical conductor, and a plurality of elongated resilient contact elements supported by said member and extended from an end thereof and arranged in contact with the inner face of said tubular electrical conductor.

4. A joint for mechanically engaging and electrically connecting an electrical conductor, comprising in combination a tubular electrical conductor, a support, a contractile clamp mounted on said support, a tubular member having a portion engaged within said clamp for securement to said support by contractile clamping action of said clamp, a plurality of elongated resilient contact elements supported by said clamp and extended beyond an end thereof and arranged in contact with the outer face of said tubular electrical conductor, and a plurality of elongated resilient contact elements supported by said member and extended from an end thereof and arranged in contact with the inner face of said tubular electrical conductor.

5. A joint for mechanically engaging and electrically connecting an electrical conductor, comprising in combination a tubular electrical conductor, a support, a contractile clamp mounted on said support, a member having a portion engaged within said clamp and substantially embraced thereby for securement to said support by contractile clamping action of said clamp, a plurality of elongated resilient contact elements supported by said clamp and extended beyond an end thereof and arranged in contact with the outer face of said tubular electrical conductor, and a plurality of elongated resilient contact elements supported by said member and extended from an end thereof and arranged in contact with the inner face of said tubular electrical conductor.

6. A joint for mechanically engaging and electrically connecting an electrical conductor, comprising in combination a tubular electrical conductor, a support, a contractile clamp mounted on said support, a member having a portion engaged within said clamp for securement to said support by contractile clamping action of said clamp, a plurality of elongated resilient contact elements supported by said clamp and extended beyond an end thereof and arranged in contact with the outer face of said tubular electrical conductor, and a plurality of elongated resilient contact elements supported by said member and extended from an end thereof and arranged in contact with the inner face of said tubular electrical conductor, said elongated resilient contact elements being provided with curved contacting portions at the points where they contact with the outer and inner faces of said tubular electrical conductor.

FIRMIN M. CUNNINGHAM.